(12) United States Patent
Kearns

(10) Patent No.: US 7,239,853 B2
(45) Date of Patent: Jul. 3, 2007

(54) ANTENNA SWITCHING CIRCUIT

(75) Inventor: Brian Kearns, Dublin (IE)

(73) Assignee: TDK Corporation, Tokyo (JP)

( * ) Notice: Subject to any disclaimer, the term of this patent is extended or adjusted under 35 U.S.C. 154(b) by 541 days.

(21) Appl. No.: 10/714,023

(22) Filed: Nov. 13, 2003

(65) Prior Publication Data

US 2004/0132487 A1  Jul. 8, 2004

(30) Foreign Application Priority Data

Dec. 6, 2002  (EP) .................................. 02394113

(51) Int. Cl.
*H04B 1/44* (2006.01)

(52) U.S. Cl. ...................... 455/83; 455/552.1; 333/101

(58) Field of Classification Search ............ 455/78–83, 455/552.1, 553, 553.1; 333/101–103, 124, 333/132

See application file for complete search history.

(56) References Cited

U.S. PATENT DOCUMENTS

| 5,486,836 A | 1/1996 | Kuffner et al. |
|---|---|---|
| 5,507,011 A | 4/1996 | Chigodo et al. |
| 6,021,318 A | 2/2000 | Schaffer |
| 6,249,687 B1* | 6/2001 | Thomsen et al. ........ 455/553.1 |
| 2001/0027119 A1 | 10/2001 | Furutani et al. |
| 2002/0039056 A1* | 4/2002 | Kawachi et al. ............ 333/193 |

FOREIGN PATENT DOCUMENTS

| DE | 198 42 706 A1 | 3/2000 |
|---|---|---|
| DE | 100 52 711 A1 | 5/2002 |
| EP | 1 079 531 A2 | 2/2001 |
| EP | 1 223 634 A2 | 7/2002 |
| EP | 1 237 222 A1 | 9/2002 |
| JP | 2001-186047 A1 | 7/2001 |
| JP | 2001-285122 A1 | 10/2001 |
| JP | 2001-345733 A1 | 12/2001 |
| JP | 2002-016401 A1 | 1/2002 |
| WO | WO-00/11800 A1 | 3/2000 |
| WO | WO-01/99444 A1 | 12/2001 |
| WO | WO-02/065780 A1 | 8/2002 |

* cited by examiner

*Primary Examiner*—Lee Nguyen
(74) *Attorney, Agent, or Firm*—Darby & Darby

(57) ABSTRACT

A switching circuit for use at the antenna of a multiband mobile cellular handset comprises an antenna port 10, a TX low band port 14, a TX high band port 12 and at least one RX port 16. A single pole, triple throw solid state voltage-controlled switch made up of four PIN diodes D1 to D4 selectively connects any one of the TX low band port, TX high band port and RX port to the antenna port. No diplexer is used to separate the low and high band parts o the circuit.

11 Claims, 11 Drawing Sheets

ANTENNA SWITCHING CIRCUIT

This invention relates to a switching circuit for use at the antenna of a multiband mobile cellular handset to select between the TX and RX modes of the bands.

Multiband GSM-based mobile cellular handsets generally include a number of circuits for the TX and RX of the different bands of the handset. To select between the TX and RX modes of the various RF bands, a switching circuit is usually employed at the antenna of the handset. The function of the switching circuit is to electrically connect the antenna of the cellular handset to the TX or RX circuit of the band which is in use at a given time, and to simultaneously isolate all other sections of the handset from the antenna. This switching circuit is often incorporated into a single module, and this switching module is sometimes referred to as an antenna switch module (ASM). In addition to the switching function described above, the ASM may include low pass filters at the TX ports to filter out unwanted harmonics from the TX signals.

A dual band cellular handset is normally designed to operate on a low band and on a high band. For example, handsets designed to operate within Europe generally are capable of transmitting and receiving on the EGSM and DCS bands. The frequencies of operation of the TX and RX of the EGSM and DCS bands are listed in Table 1. It can be seen that the TX and RX frequencies of the EGSM band are centred around 920 MHz (low band), whereas the TX and RX frequencies of the DCS band are centred around 1800 MHz (high band). A dual band ASM, for use in such a dual band cellular handset, facilitates switching of a single antenna between a TX low band input, a TX high band input, an RX low band output and an RX high band output. Consequently, a conventional dual band ASM has 5 ports: TX low band port, TX high band port, RX low band port, RX high band port, and antenna port.

TABLE 1

| Cellular System | TX Frequency Range | RX Frequency Range |
| --- | --- | --- |
| AGSM | 824–849 MHz | 869–894 MHz |
| EGSM | 880–915 MHz | 925–960 MHz |
| DCS | 1710–1785 MHz | 1805–1880 MHz |
| PCS | 1850–1910 MHz | 1930–1990 MHz |
| W-CDMA | 1920–1980 MHz | 2110–2170 MHz |

European Patent Application EP 0 921 642 discloses a conventional dual band ASM employing a diplexer at the antenna to separate the low band and the high band and further employing a pair of SP2T PIN switches to select between the TX and RX in each band. The ASM described in EP 0 921 642 also includes low pass filters at each of the two TX inputs.

It is an object of this invention to provide an improved antenna switching circuit which avoids the need for a diplexer at the antenna to separate the low band and the high band.

This object is met by the invention described by claim 1.

An embodiment of the invention provides a dual band ASM which represents a significant departure from the conventional topologies of dual band PIN switched ASMs as exemplified by EP 0 921 642. The embodiment has only 4 ports: TX low band port, TX high band port, RX port, and antenna port. It is based around a dual band SP3T PIN switch which can alternately connect the antenna port to the TX low band port, the TX high band port or the RX port. The various switching states are implemented using two control voltages.

The absence of a diplexer in the TX and RX signal paths results in a significant reduction in the insertion loss of the ASM. In addition, this absence improves the VSWR (Voltage Standing Wave Ratio) at the various ports of the ASM.

The embodiment can be modified so that there are a pair of RX ports for cellular handset applications requiring an ASM with a low band RX port and a high band RX port. This modification can be achieved by the inclusion of a conventional diplexer at the RX output. In this case the benefits of reduced loss, and reduced VSWR, apply to the TX ports only.

The TX high band frequency range, i.e. the frequency range of signals entering the TX high band port, may be that of a single cellular high frequency band, e.g. the DCS band, or that of a combination of cellular high frequency bands, e.g. the DCS and PCS bands. Similarly, the TX low band frequency range, i.e. the frequency range of signals entering the TX low band port, may be that of a single cellular low frequency band, e.g. the EGSM band, or that of a combination of cellular low frequency bands, e.g. the EGSM and AGSM bands.

Embodiments of the invention will now be described, by way of example, with reference to the accompanying drawings, in which:

FIG. 6b shows a circuit diagram of a possible implementation of the SAW triplexer of FIG. 6a.

FIG. 8 shows a low-band, high-band branching circuit which can be used in the impedance matching circuit of the SAW triplexer of FIG. 6a.

FIG. 9 shows a circuit diagram of a PIN switched triple band FEM, based on the ASM of FIG. 1 and the triplexer of FIG. 6a.

FIG. 10b shows a possible implementation of the SAW quadplexer of FIG. 10a.

FIG. 11 shows a circuit diagram of a quadband FEM, based on the ASM of FIG. 1 and the quadplexer of FIG. 10a.

DETAILED DESCRIPTION OF THE INVENTION

Figure 1:
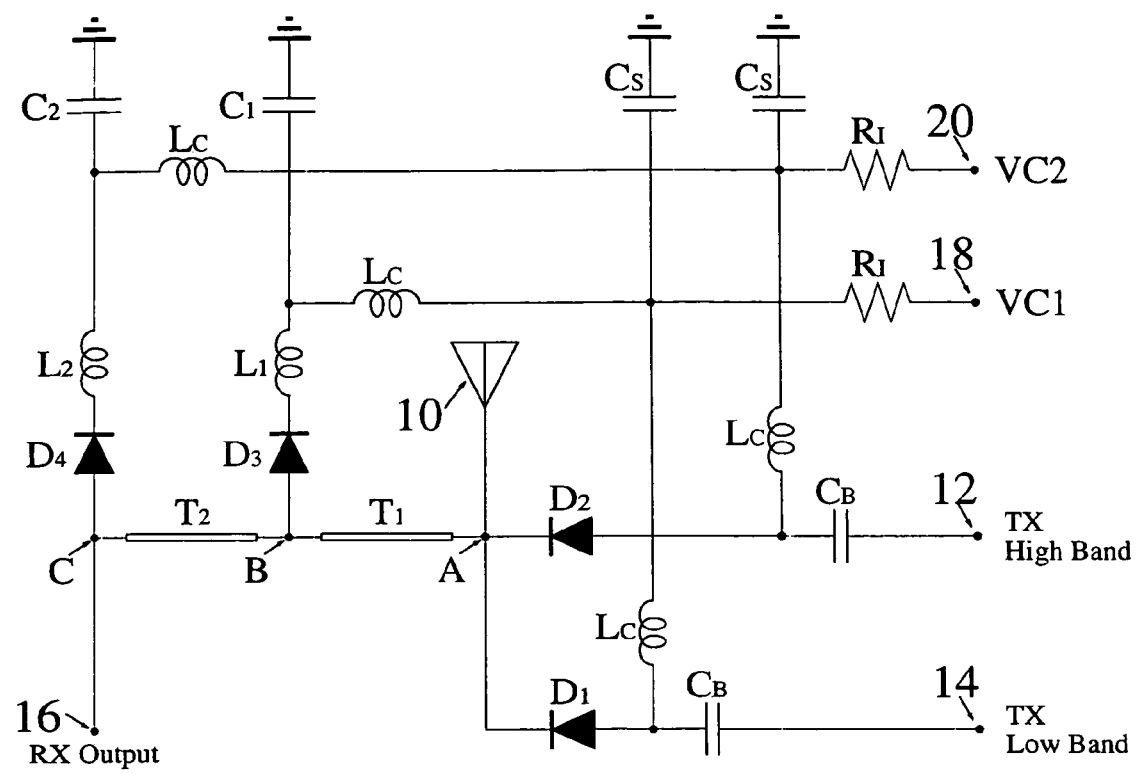
FIG. 1 shows a circuit diagram of an ASM according to an embodiment of the invention employing a SP3T silicon PIN diode switch.

FIG. 1 shows a block diagram of an ASM which employs a SP3T switch, comprising four silicon PIN diodes $D_1$ to $D_4$, to selectively connect an antenna port 10 to a TX high band input port 12, a TX low band input port 14, or an RX output port 16 according to the combination of voltages VC1, VC2 applied at voltage input terminals 18, 20 respectively.

The TX high band port 12 is connected via a DC blocking capacitor $C_B$ to the anode of $D_2$, and the TX low band port 14 is similarly connected via a DC blocking capacitor $C_B$ to the anode of $D_1$. The antenna port 10 is connected at node A to the cathodes of both diodes $D_1$ and $D_2$, at node B to the anode of $D_3$ via a first microstrip transmission line $T_1$, and at node C to the anode of $D_4$ and the RX output port 16 via a further microstrip transmission line $T_2$ connected in series with the first transmission line $T_1$. The cathode of $D_3$ is connected to ground via an LC resonator comprising $L_1$ and $C_1$, and the cathode of $D_4$ is likewise connected to ground via an LC resonator comprising $L_2$ and $C_2$. The inductances $L_1$ and $L_2$ may be specifically selected to optimise the electrical characteristics of the antenna switch, or may be constituted solely by the parasitic inductances of the respective diodes $D_3$, $D_4$.

The voltage input terminal 18 for VC1 is connected via a current regulating resistor $R_I$ and a DC choke $L_c$ to the anode of $D_1$, and via a further DC choke $L_c$ to the cathode of $D_3$. A voltage smoothing capacitor $C_s$ is added to the circuit, in a configuration such that one terminal of this capacitor is connected to the node where the resistor $R_I$ and the two DC chokes $L_c$ meet, and the other terminal is connected to ground.

The voltage input terminal 20 for VC2 is similarly connected via a current regulating resistor $R_I$ and a DC choke $L_c$ to the anode of $D_2$, and via a further DC choke $L_c$ to the cathode of $D_4$. A second smoothing capacitor $C_s$ is added to the circuit, so that one terminal of this second capacitor is connected to the node where the resistor $R_I$ and the two DC chokes $L_c$ meet, and the other terminal is connected to ground.

The TX low band of FIG. 1 could be defined by the upper and lower edges of the frequencies of the AGSM cellular system, the EGSM cellular system, or any other cellular system with a frequency range around 1 GHz, or any combination of these systems (see Table 1). The TX high band could be defined by the upper and lower bounds of the frequencies of the DCS cellular system, the PCS cellular system, or any other cellular system with a frequency range around 2 GHz, or any combination of these systems (see also Table 1).

In the present embodiment it is assumed that the TX low band is defined by the TX frequency range of the EGSM cellular system, and that the TX high band is defined by the TX frequency range of the DCS cellular system.

The ASM circuit of FIG. 1 has three switching states (to allow SP3T operation). The switching logic for all three states is given in Table 2.

TABLE 2

| Switching State | ASM Function | VC1 | VC2 |
|---|---|---|---|
| 1 | RX | 0 | 0 |
| 2 | High Band TX | 0 | +V |
| 3 | Low Band TX | +V | 0 |

Switching State 1.

In this state the voltages VC1 applied at 18 and VC2 applied at 20 are both zero. This results in a potential difference of zero volts across all four diodes $D_1$–$D_4$, so that all diodes are in the off state. A diode in the off state has a very high impedance, hence, in this state, the two TX ports 12 and 14 are isolated from the circuit, and the two resonators (one comprising $L_1$ and $C_1$ and the other comprising $L_2$ and $C_2$) leading to ground from nodes B and C are also isolated from the circuit.

Consequently, in switching state 1, a signal entering the ASM of FIG. 1 at the antenna port 10 will pass from the antenna port 10 to node A, and from node A, along transmission lines $T_1$ and $T_2$, to the RX output port 16.

Switching State 2

In this state, the voltage VC2 applied at 20 is high and the voltage VC1 applied at 18 is zero, so that diodes $D_1$ and $D_4$ are in the off state and diodes $D_2$ and $D_3$ are in the on state. A diode in the on state has a very low impedance, hence, in this state, the TX high band port 12 is connected directly to node A via the very low impedance of the switched on diode $D_2$. Conversely, since diode $D_1$ is switched off, the impedance of the circuit path from node A to the TX low band port 14 is very high, and hence the TX low band port is isolated from node A. Along the circuit path from node A to the RX port 16, diode $D_3$ is switched on, connecting node B to ground via the series LC resonator comprising $L_1$ and $C_1$. This resonator is tuned to have a resonance at the centre of the high band TX frequency range (1747.5 MHz for DCS), and therefore within the range of the DCS TX frequencies the impedance to ground at node B is almost zero (i.e. a short circuit). The short circuit at node B is connected to one end of the transmission line $T_1$, the other end of the line $T_1$ being connected to node A. Transmission line $T_1$ is constructed to have an electrical length of 90 degrees at the centre of the high band TX frequency range (1747.5 MHz). A transmission line with an electrical length of 90 degrees at a particular frequency is often referred to as a quarter wave transmission line, and the phase of the reflection coefficient at one end of a quarter wave transmission line is rotated through π radians at the other end. For example, a short circuit, which has a reflection co-efficient of −1, will have a reflection co-efficient of +1 when measured from the far end of a quarter wave transmission line and conversely, an open circuit, which has a reflection co-efficient of +1, will have a reflection co-efficient of −1 when measured from the far end of a quarter wave transmission line. Hence, at frequencies near 1747.5 MHz the short circuit at node B (which has a reflection co-efficient of −1) appears like an open circuit at node A (which has a reflection co-efficient of +1), so that at these frequencies the path from node A to the RX port 16 is electrically equivalent to an open circuit.

To summarise, in switching state 2, the branch of the ASM circuit leading from node A to the high band input 12 has a very low impedance, whereas two of the branches connected to node A are open circuit (or have a very high impedance): the branch leading to the RX port 16 and the branch leading to the TX low band port 14. Consequently, signals in the range 1710–1785 MHz coming from the TX high band port 12 will pass via diode $D_2$ and node A to the antenna port 10.

Switching State 3

In this state, the voltage VC1 applied at 18 is high and the voltage VC2 applied at 20 is zero, so that diodes $D_2$ and $D_3$ are in the off state and diodes $D_1$ and $D_4$ are in the on state. Since diode $D_2$ is switched off, the impedance of the circuit path from node A to the TX high band port 14 is very high, and hence the TX high band port is isolated from node A. However the TX low band port 14 is connected directly to node A via the very low impedance of the switched on diode $D_1$. Along the circuit path from node A to the RX port 16, since diode $D_3$ is in the off state, the resonator, comprising $L_1$ and $C_1$, which connects diode $D_3$ to ground is isolated from node B. However, diode $D_4$ is switched on, so node C is connected to ground via the LC resonator comprising $L_2$ and $C_2$. This resonator is tuned to have a resonance at the centre of the low band TX frequency range (897.5 MHz), and therefore near this frequency, the impedance to ground at node C is almost zero (i.e. a short circuit). The short circuit at node C is at one end of the pair of transmission lines $T_1$ and $T_2$ which are connected in series. Since diode $D_3$ is switched off in this state, the pair of transmission lines $T_1$ and $T_2$ can be treated like a single transmission line, with an electrical length which is equal to the sum of the lengths of both lines. As stated above, $T_1$ is constructed so that it has an electrical length of 90 degrees at the centre of the high band TX frequency range (1747.5 MHz); this corresponds to an electrical length of approximately 46 degrees at the centre of the low band frequency range (897.5 MHz). Accordingly, $T_2$ is designed so that it has an electrical length of approximately 44 degrees at the centre of the low band frequency range (i.e. so that the transmission lines $T_1$ and $T_2$ have a combined electrical length of 90 degrees at 897.5 MHz). The other end of this pair of transmission lines is connected to node A. As described above, a transmission line with an electrical length of 90 degrees has the effect of rotating the phase of the reflection coefficient at one end of the line through $\pi$ radians at the other end. Hence, at frequencies around 897.5 MHz the short circuit at node C appears like an open circuit at node A, so that at these frequencies, the path from node A to the RX port 16 is electrically equivalent to an open circuit.

To summarise, in switching state 3, the branch of the ASM circuit leading from node A to the low band input 14 has a very low impedance, whereas two of the branches connected to node A are open circuit (or have a very high impedance): the branch leading to the RX port 16 and the branch leading to the TX high band port 14. Consequently, signals in the range 880–915 MHz coming from the TX low band port 14 will pass via diode $D_1$, and node A to the antenna port 10.

The primary difference between the conventional ASM disclosed in EP 0 921 642 and the novel ASM of FIG. 1 is that the conventional ASM is divided into a low band section and a high band section by placing a diplexer at the antenna. The absence of a conventional diplexer at the antenna of the ASM of FIG. 1 reduces the insertion loss of the ASM. The reduction in insertion loss is due to the fact that there are less components in the paths of TX and RX signals which enter the ASM. The insertion loss of a conventional diplexer is typically in the order of 0.5 dB at the low band and 0.75 dB at the high band. The absence of a diplexer at the antenna port also considerably improves the VSWR of the ASM, which is of paramount importance in the TX path, since a high VSWR results in a large signal being reflected back into the power amplifier of the handset which has a detrimental effect on the RF performance of the cellular handset.

Another difference between the ASM of FIG. 1 and the conventional ASM of EP 0 921 642 is that there is only a single RX port for the ASM of FIG. 1, whereas the ASM of EP 0 921 642 has two RX ports—low band RX and high band RX.

Figure 2:
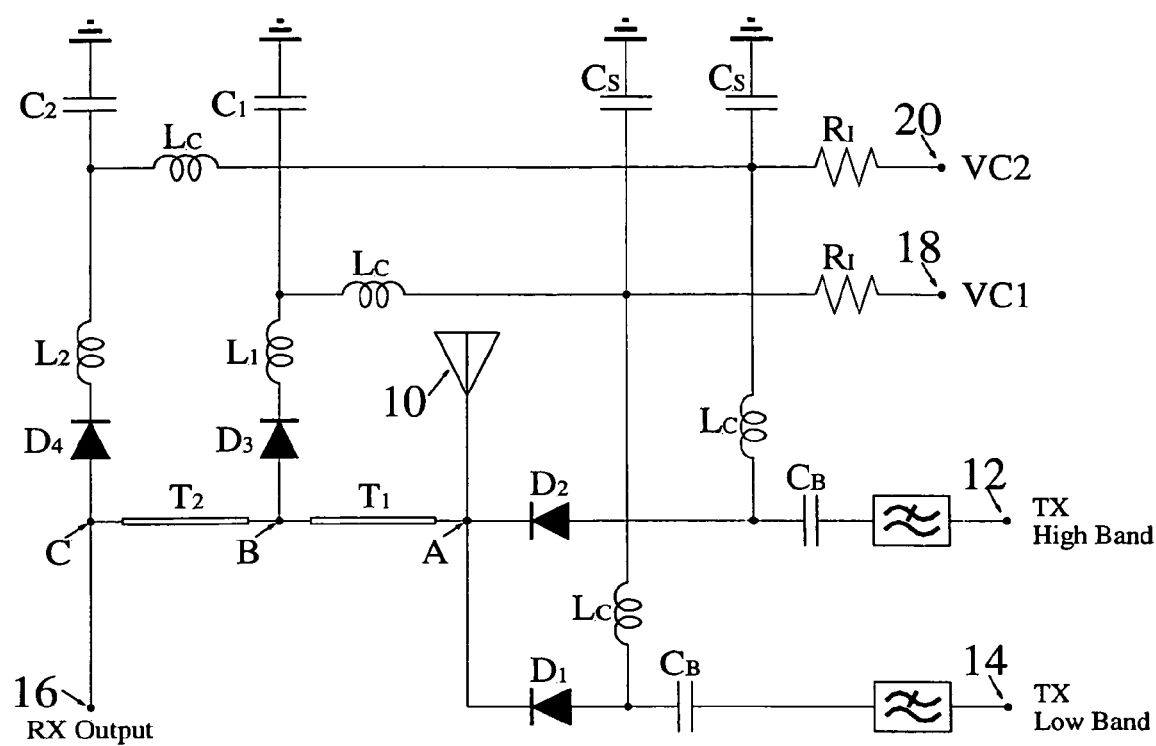
FIG. 2 shows a modified version the ASM of FIG. 1, where low pass filters have been added at each of the TX inputs.

FIG. 2 shows the novel ASM of FIG. 1 modified to include low pass filters at the TX low band input and at the TX high band input, which may be required to filter out unwanted harmonics present in the TX signals entering the TX ports of the ASM.

Figure 3:
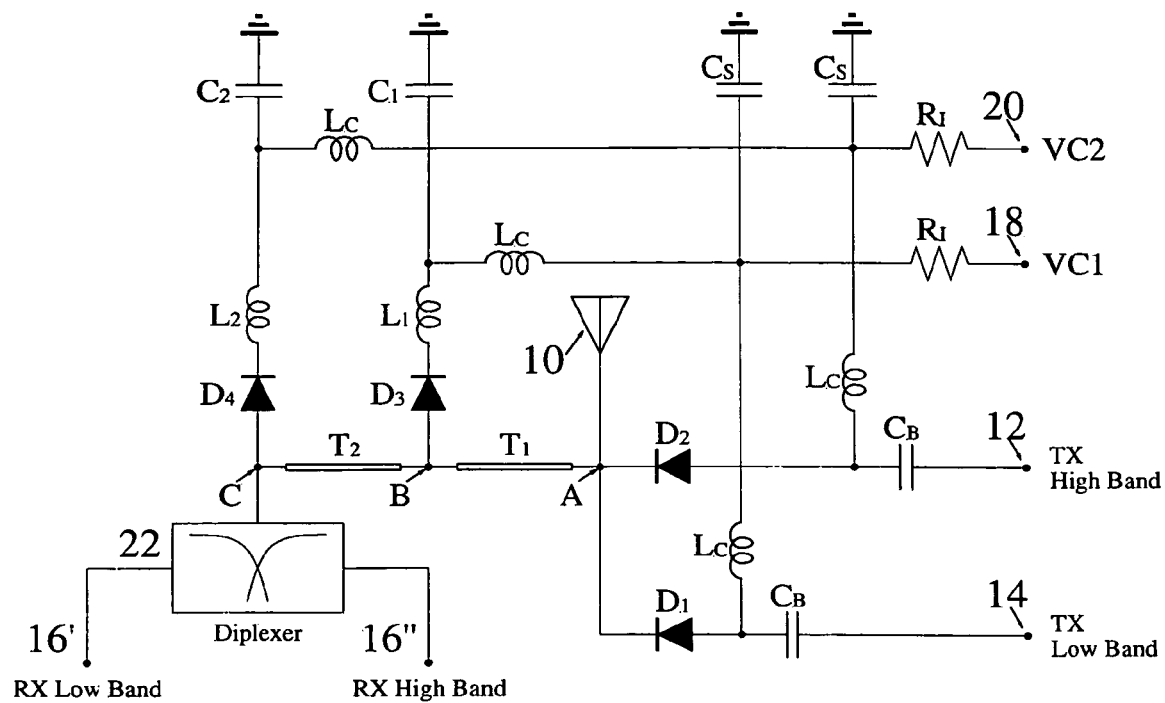
FIG. 3 shows the ASM of FIG. 1 modified to include a pair of RX ports.

For applications where a pair of RX ports are required, the ASM of FIG. 1 can be modified to suit the requirements by the inclusion of a conventional diplexer at node C, as shown in FIG. 3. Inclusion of a diplexer at the RX port 16 of the ASM of FIG. 1 provides RX low and RX high band ports 16', 16" respectively. Although this modification increases the insertion loss of the ASM along the RX paths, it has no effect on the insertion loss of the ASM along the TX paths. Similarly, this modification has no effect on the VSWR at the TX ports and at the antenna port when the ASM is in either of the TX modes. Consequently, it can be seen that the ASM of FIG. 1 can be configured to give exactly the same functionality as the conventional ASM of EP 0 921 642, but with the additional benefit of lower insertion loss in the TX paths and improved VSWR in the TX paths.

It has been stated herein that in switching state 2, the purpose of the transmission line $T_1$ in FIGS. 1–3 is to transform the short circuit at node B, which results from the switched on diode $D_3$ connected in series with $L_1$ and $C_1$, so that this short circuit appears as an open circuit at node A. Similarly it has been stated that the purpose of the transmission line $T_2$ is so that the combined effect of $T_1$ and $T_2$ is to transform the short circuit at node C, resulting from the switched on diode $D_4$ connected in series with $L_2$ and $C_2$, so that this short circuit appears as an open circuit at node A.

Accordingly, the transmission lines $T_1$ and $T_2$ can individually be replaced by any electrical circuit which has the effect of adding the appropriate phase shift at the TX low band, and the appropriate phase shift at the TX high band.

Figure 4:
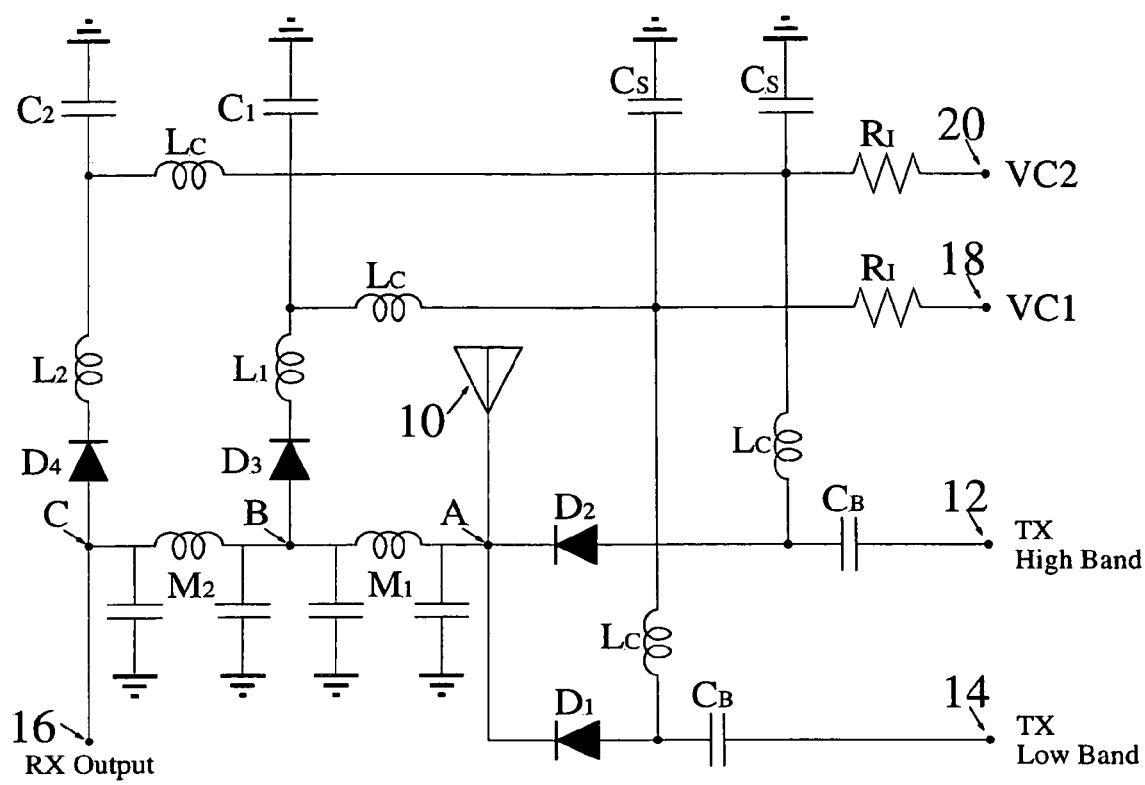
FIG. 4 shows a modification of the ASM of FIG. 1 where each of the phase shifting transmission lines $T_1$ and $T_2$ have been replaced by a phase shifting network comprising of lumped components $M_1$ and $M_2$.

FIG. 4 shows a modification of the ASM of FIG. 1, where the phase shifting transmission lines $T_1$ and $T_2$, have been replaced with circuits $M_1$ and $M_2$ each comprising a respective pi-type LC network which includes a single series inductor buffered on either side by a shunt capacitor. The inductor and capacitors in the circuit $M_1$ are chosen so that $M_1$ gives rise to the same electrical phase shift as transmission line $T_1$; whereas the inductor and capacitors in the circuit $M_2$ are chosen so that the circuits $M_1$ and $M_2$ together give rise to the same electrical phase shift as the serially connected transmission lines $T_1$ and $T_2$.

Typically, all passive components such as transmission lines, matching circuits, and LC elements required to implement embodiments of the invention are implemented within and/or on the surface of a multi-layer substrate such a Low Temperature Co-Fired Ceramic (LTCC) substrate.

Application to Dual Band Front End Module

Figure 5:
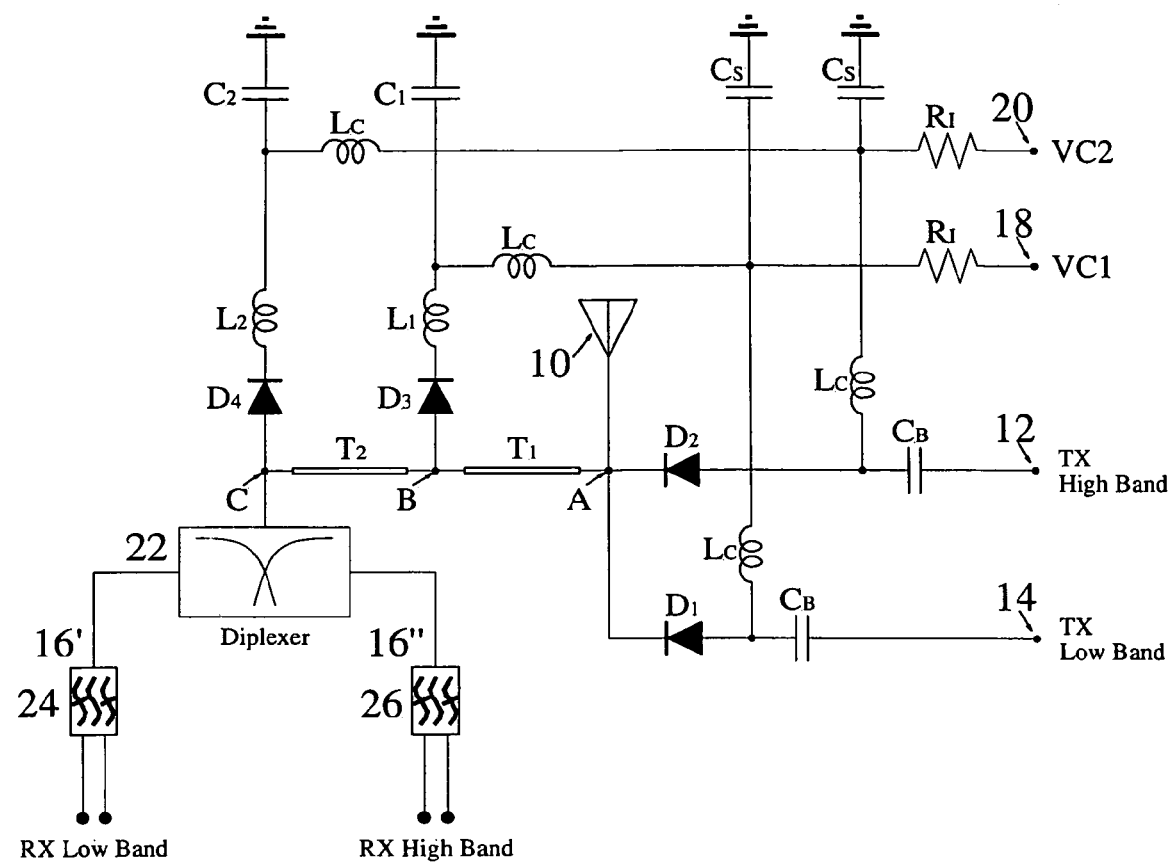
FIG. 5 shows a dual band front end module (FEM) based on the ASM of FIG. 1.

A front end module (FEM) is an ASM which includes the RX filters that are normally located external to the ASM. The RX filters employed are usually of the surface acoustic wave (SAW) type due to their small size and low insertion loss. SAW filters have the additional benefit of being capable of providing unbalanced to balanced conversion, which is useful in cases where the RX input of the cellular handset comprises a pair of balanced terminals. The ASM of FIG. 2 can be converted into a dual band FEM by the addition of a pair of RX SAW filters 24 and 26 at the outputs 16', 16" of the diplexer 22 as depicted in FIG. 5.

Application to Triple Band Front End Module

In recent times, there has been an increasing demand for triple band cellular handsets, which can operate on the EGSM, DCS and PCS bands (Table 1).

For triple band FEM, two TX ports are usually sufficient, as it is common for triple band cellular handsets to include only two power amplifiers, one for the EGSM TX, and one for the DCS and PCS TX. However separate RX ports are usually required for each band. So a triple band FEM generally includes 6 ports: TX low band port, TX high band port, three separate RX ports, and an antenna port.

An FEM covering the EGSM, DCS and PCS bands can be constructed from a conventional dual-band ASM as follows: by adjusting the TX high band section of the ASM so that it is optimised for TX signals in a range extending from the lower edge of the DCS TX and the upper edge of the PCS TX band (i.e. 1710 to 1910 MHz); by the addition of a single EGSM SAW filter at the low band RX output; and by the addition of a DCS/PCS SAW duplexer at the high band RX output—see US Patent Application US2002/0032038.

To construct an FEM covering the EGSM, DCS and PCS bands using the ASM of FIG. 1, the TX section of the ASM of FIG. 1 must be adjusted as follows: the transmission line $T_1$ is adjusted so that it has an electrical length of 90 degrees for signals midway between the lower edge of the DCS TX and the upper edge of the PCS TX band (i.e. 1810 MHz); transmission line $T_2$ is re-adjusted so that the combined electrical length of $T_1$ and $T_2$ is 90 degrees for signals in the centre of the EGSM TX band (897.5 MHz) the LC resonator comprising $L_1$ and $C_1$ is adjusted so that its resonant frequency is equal to 1810 MHz.

Similarly the RX section of the ASM of FIG. 1 must be modified to include three bandpass filters, one for each of the EGSM, DCS and PCS bands. However, the ASM shown in FIG. 1 has only a single RX port, so the method outlined in U.S. Patent Application US2002/0032038 cannot be used here.

To convert the RX section of the ASM of FIG. 1 for triple band FEM functionality, a circuit is required which has a single input, which includes three outputs, and which further includes three RX bandpass filters such that the outputs of each of the three bandpass filters are connected to the outputs of the said circuit. This circuit must further be designed so that electrical signals at frequencies within the pass bands of any one of the bandpass filters which are applied to the input of the circuit will pass directly to the corresponding output of the circuit. Preferably the three bandpass filters are SAW filters and in such case this circuit will be referred to as a SAW triplexer herein.

Figure 6A:
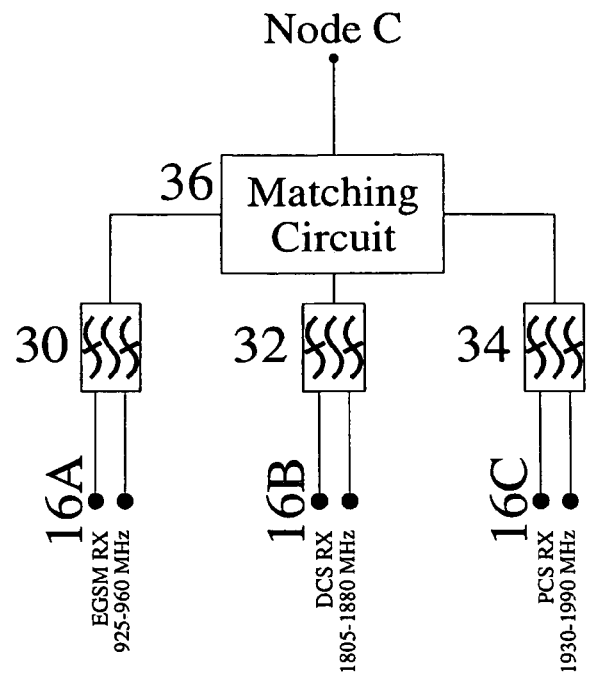
FIG. 6a shows a block diagram of a SAW triplexer.

A block diagram of a SAW triplexer is shown in FIG. 6a, wherein three balanced output SAW filters 30, 32 and 34 are connected to node C via an impedance matching circuit 36 to provide three RX ports 16A, 16B and 16C with balanced outputs, one for each band. The impedance matching circuit 36 is designed so that when the three balanced outputs of the SAW triplexer are optimally terminated, the impedance to ground from node C along the circuit paths through any two of the SAW filters 30–34 is very high compared with the impedance to ground along the circuit path through the other SAW filter at frequencies within the passband of that filter.

Figure 6B:
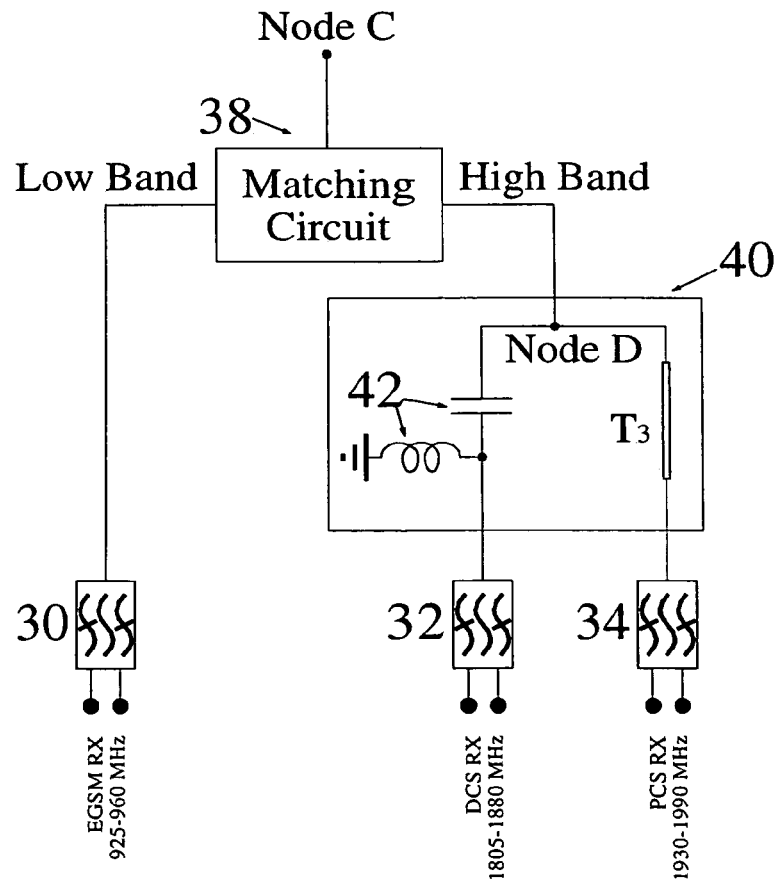

A possible implementation of the SAW triplexer of FIG. 6a is shown in FIG. 6b. This circuit includes a primary impedance matching sub-circuit 38 which is connected to node C, and a secondary impedance matching sub-circuit 40 which is connected to node D. The circuit also includes the three balanced output bandpass SAW filters: one SAW filter 30 with a pass band which coincides with the EGSM cellular system, one SAW filter 32 with a pass band which coincides with the DCS cellular system, and one SAW filter 34 with a pass band which coincides with the PCS cellular system.

The function of the primary sub-circuit 38 (an example of which will be described below) is the isolation of the high band SAW filters from node C at low band frequencies, and the simultaneous isolation of the low band SAW filter from node C at frequencies in the high band.

The secondary sub-circuit 40 comprises a length of transmission line $T_3$ connected to the input of the PCS SAW filter 34, and an LC network 42 connected to the input of the DCS SAW filter 32. The length of line $T_3$ at the input of the PCS filter 34 has the effect of raising the impedance of the path from node D to the PCS output to a very high value at frequencies within the DCS band. However, the transmission line $T_3$ has no effect on the response of the PCS filter at frequencies within the PCS band. Similarly, the LC network 42 at the input of the DCS filter 32 has the effect of raising the impedance of the path from node D to the DCS output to a very high value at frequencies within the PCS band, but has no effect on the response of the DCS filter within the DCS band.

Thus it can be seen that the secondary sub-circuit 40, which is connected to node D, together with the DCS and PCS SAW filters 32 and 34, achieves the functionality of a duplexer, so that electrical signals at frequencies within the DCS pass band at node D will pass directly to the DCS output of the triplexer, and electrical signals at frequencies within the PCS pass band at node D will pass directly to the PCS output of the triplexer.

A number of other embodiments of the secondary sub-circuit 40 exist in order that the secondary sub-circuit 40 together with the SAW filters 32 and 34 achieve the functionality of a DCS/PCS duplexer. A second embodiment would involve replacing transmission line $T_3$ with a matching circuit comprising of discrete components in the same manner that the transmission lines $T_1$ and $T_2$ in FIGS. 1–3 can be replaced by LC matching circuits $M_1$ and $M_2$ as shown in FIG. 4 above. A third embodiment would involve replacing the LC network 42 with a further transmission line, though for this embodiment, the new transmission line would preferably be connected in parallel with filter 42, so that one end of the transmission line was connected directly to ground.

Figure 7:
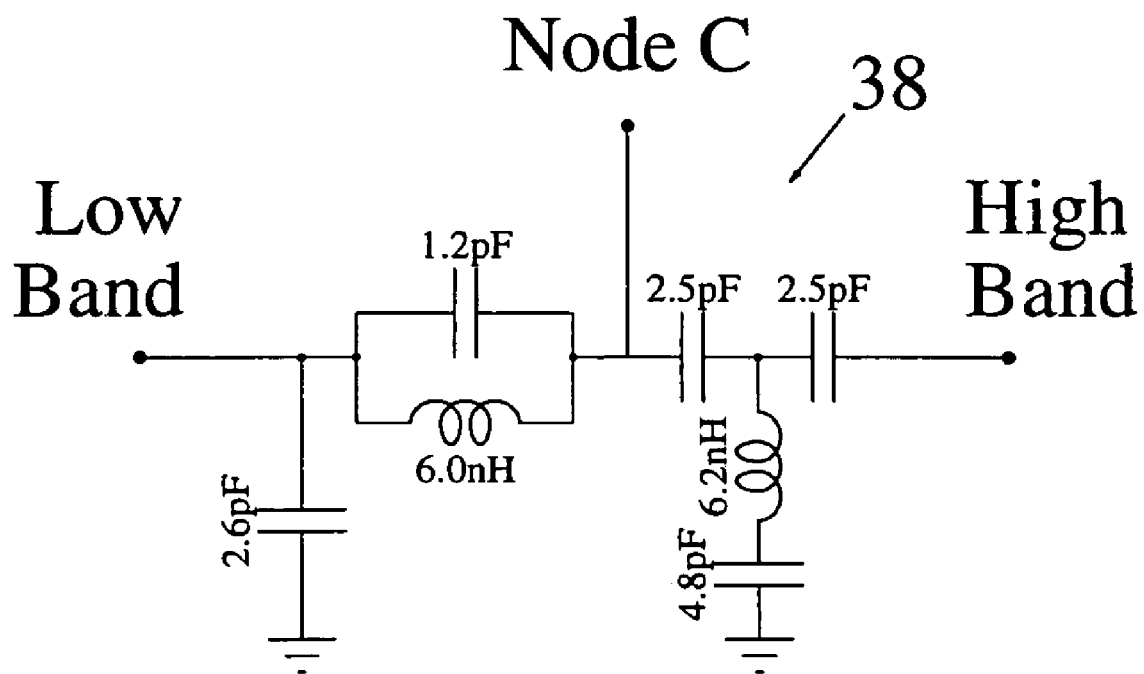
FIG. 7 shows a conventional diplexer.

The primary impedance matching sub-circuit 38, which is connected to node C of the SAW triplexer of FIG. 6b can be implemented by a conventional diplexer such as that shown in FIG. 7. A conventional diplexer includes three ports: a low band port, which is connected to one side of the circuit; a high band port, which is connected to the other side of the circuit; and a third port, which is connected to a point inside the circuit (denoted by node C in FIG. 7). The component values of the diplexer are chosen so that when all of the ports of the diplexer are optimally terminated, the response of the diplexer, measured from node C to the low band port is that of a low pass filter, and the response of the diplexer, measured from node C to the high band port is that of a high pass filter. Hence, the use of a conventional diplexer, such as that shown in FIG. 7, for the primary sub-circuit 38 in the SAW triplexer of FIG. 6b, achieves the desired result i.e. the isolation of the high band SAW filters from node C at low band frequencies, and the simultaneous isolation of the low band SAW filter from node C at frequencies in the high band.

Despite fulfilling the isolation requirements of the primary sub-circuit 38 of FIG. 6b, the filtering effects introduced by a conventional diplexer are not a necessary requirement of the primary sub-circuit 38.

Figure 8:
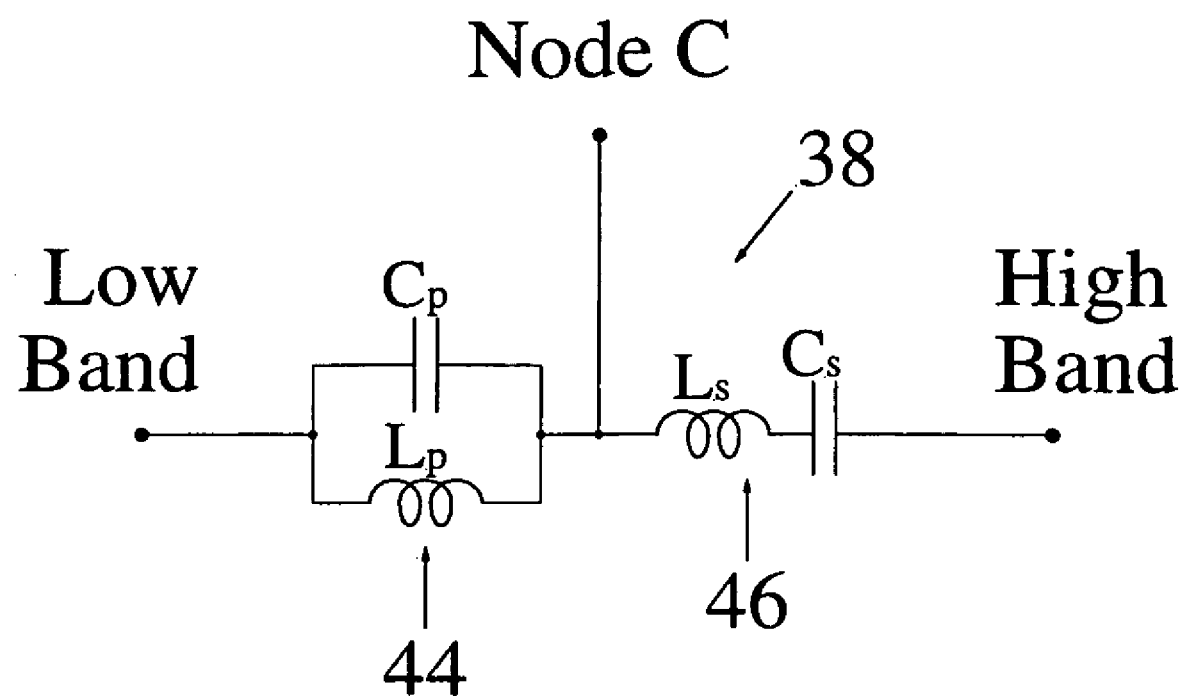

FIG. 8 shows an alternative circuit for the primary sub-circuit 38 of FIG. 6b, which may be used in place of the conventional diplexer to isolate the high band and low band SAW filters. The circuit of FIG. 8 is a branching circuit which comprises a pair of tuned circuits: a parallel tuned circuit 44, comprising $L_P$ and $C_P$, and a series tuned circuit 46, comprising $L_S$ and $C_S$. These tuned circuits are connected together at node C. The values of the inductance and capacitance in the parallel tuned circuit 44 are chosen so that together with the input impedance of the optimally terminated low band SAW filter 30 they form a resonant circuit with a resonant frequency which is midway between the lower edge of the DCS RX band and the upper edge of the PCS RX band (i.e. 1897.5 MHz). Similarly the values of the inductance and the capacitance in the series tuned circuit 46 are chosen so that together with the input impedance of the secondary sub-circuit 40, and the optimally terminated high band SAW filters 32 and 34, they form a series resonant circuit with a resonant frequency which is midway between the lower edge of the DCS RX band and the upper edge of the PCS RX band. For optimum isolation, the inductances and capacitances in both resonant circuits are chosen so that the Q of the parallel resonant circuit is equal to the Q of the series resonant circuit.

For the branching circuit of FIG. 8, the values of the inductances and capacitances are calculated using equations 1a and 1b:

$$L_S = \frac{QZ}{\omega_{HB}} \qquad C_S = \frac{1}{\omega_{HB} QZ} \qquad \text{Equation 1a}$$

$$L_P = \frac{Z}{\omega_{HB} Q} \qquad C_P = \frac{Q}{\omega_{HB} Z} \qquad \text{Equation 1b}$$

where Z is the input impedance of the optimally terminated SAW filters within their respective pass bands, $\omega_{HB}$ is the frequency midway between the lower edge of the DCS RX band and the upper edge of the PCS RX band, and Q is the quality factor of the series and parallel resonators. For best results the Q in equations 1a and 1b should be in the range of 1 to 2.

The circuit of FIG. 8 has the benefit of reduced complexity compared with the conventional diplexer of FIG. 7. The circuit of FIG. 8 additionally requires no connections to ground, thereby eliminating the need for via holes in the substrate of the triplexer, which would normally be required if the first sub-circuit 38 comprised a conventional diplexer such as that depicted in FIG. 7.

It should be noted that the description of the triplexer described above is based on a circuit which employs three balanced output SAW filters. However, the triplexer could employ three unbalanced output SAW filters, and one or more of the SAW filters could be replaced by another type of RF filter, such as a dielectric resonator filter; a film bulk acoustic resonator filter, such as that described in U.S. Pat. Nos. 6,462,631 or 6,215,375; or a multi-layer filter implemented by discrete inductors and capacitors fabricated in an LTCC substrate.

Figure 9:
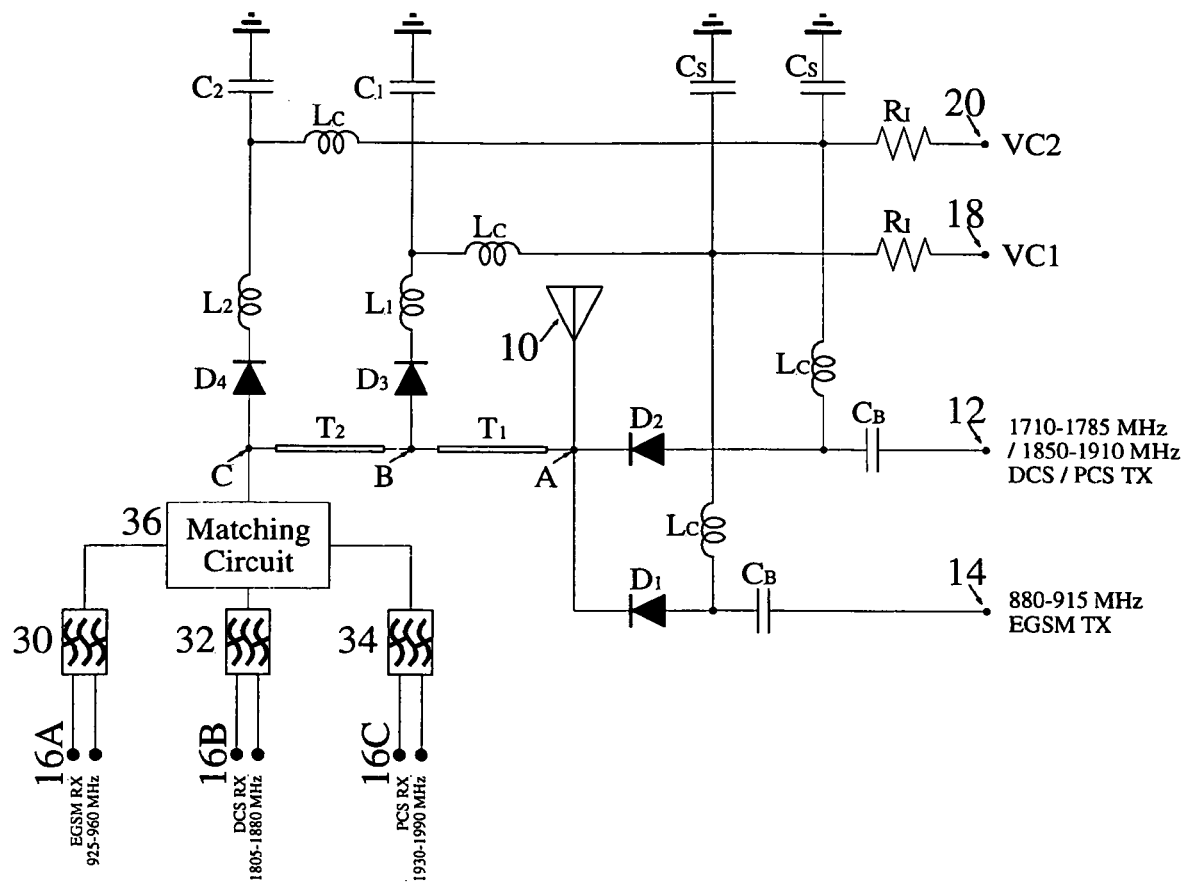

A triple band FEM for the EGSM, DCS and PCS bands, implemented using the SAW triplexer of FIG. 6a and the ASM of FIG. 1 is shown in FIG. 9. Dividing the FEM into two separate structures (an ASM and a SAW triplexer) enables a modular design approach, because the two structures are substantially independent of each other.

Application to Quad Band Front End Module

A further option for multi-band GSM-based mobile cellular handsets is that the handset be capable of transmitting and receiving on any one of four bands. For example, a quad band handset could be designed to operate on the AGSM, EGSM, DCS and PCS bands (Table 1).

A quad band FEM can be realised using the SP3T switching circuit of FIG. 1, in a similar fashion to the method outlined above for constructing a triple band FEM using the ASM of FIG. 1.

As with the triple band FEM described above, a quad band FEM covering the AGSM, EGSM, DCS and PCS bands requires only two TX inputs for the four bands—low band and high band. In this case, the low band TX input is optimised for frequencies ranging from the lower edge of the AGSM TX band to the upper edge of the EGSM TX band, and the high band TX input is optimised for frequencies ranging from the lower edge of the DCS TX band to the upper edge of the PCS TX band.

To convert the RX section of the ASM of FIG. 1 for quad band FEM functionality, a circuit is required which has a single input, which includes four outputs, and which further includes four RX bandpass filters such that the outputs of each of the four bandpass filters are connected to the outputs of the said circuit. This circuit must further be designed so that electrical signals at frequencies within the pass bands of any one of the four bandpass filters which are applied to the input of the circuit will pass directly to the corresponding output of the circuit. Preferably the four bandpass filters are SAW filters and in such case this circuit will be referred to as a SAW quadplexer herein.

Figure 10A:
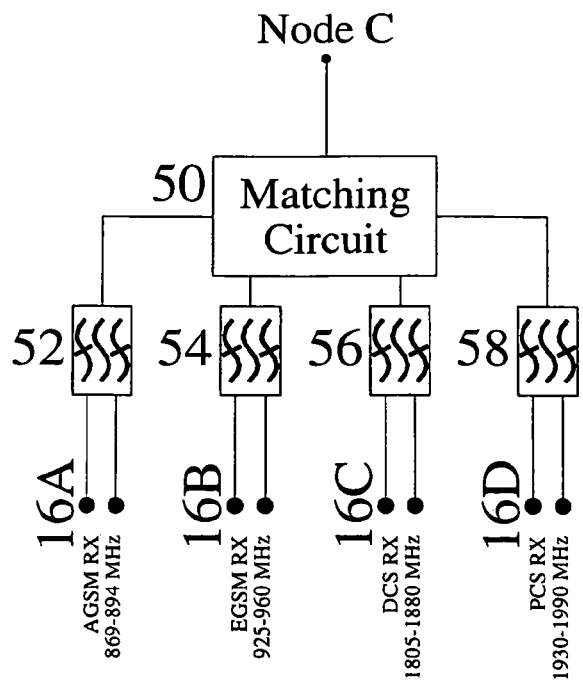
FIG. 10a shows a block diagram of a SAW quadplexer.

A block diagram of a SAW quadplexer is shown in FIG. 10a, wherein four balanced output SAW filters 52, 54 56 and 58 are connected to node C via an impedance matching circuit 50 to provide four RX ports 16A, 16B, 16C and 16D with balanced outputs, one for each band. The impedance matching circuit 50 is designed so that when the four balanced outputs of the SAW quadplexer are optimally terminated, the impedance to ground from node C along the circuit paths through any three of the SAW filters 52–58 is very high compared with the impedance to ground along the circuit path through the other SAW filter at frequencies within the passband of that filter.

Figure 10B:
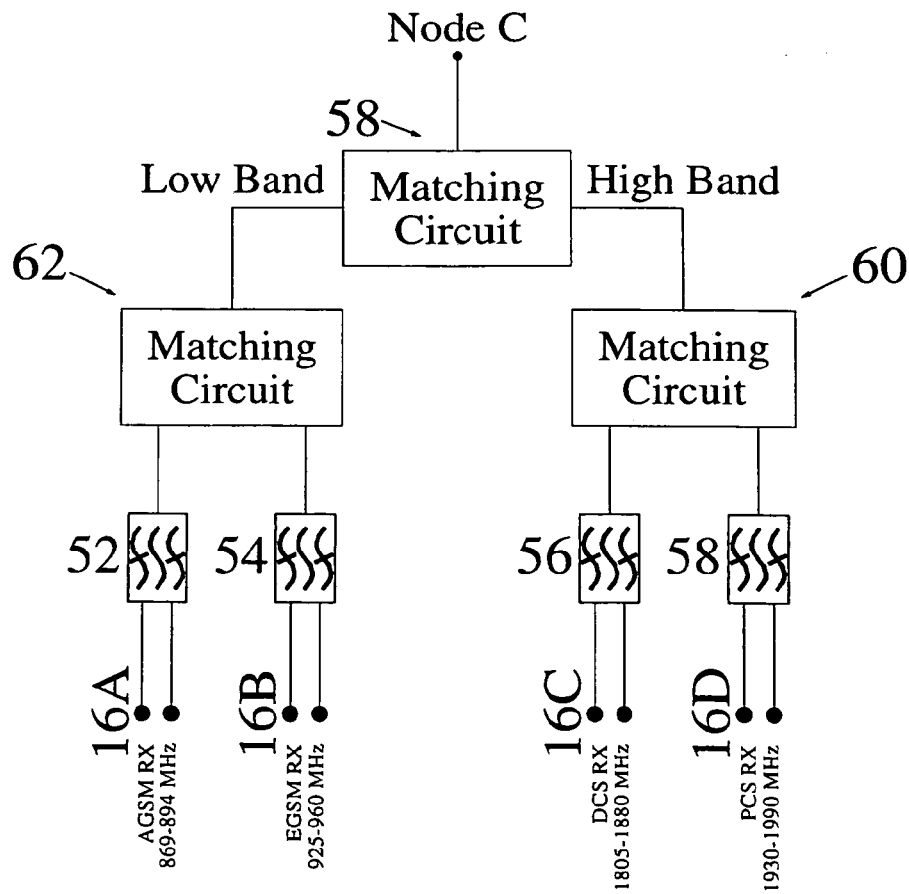

A possible implementation of the quadplexer of FIG. 10a is shown in FIG. 10b. This circuit comprises a primary impedance matching sub-circuit 58 and a pair of secondary impedance matching sub-circuits 60 and 62. The function of the primary impedance matching circuit 58 is the blocking of the high band SAW filters from node C at low band frequencies, and the simultaneous blocking of the low band SAW filter from node C at frequencies in the high band. As with the SAW triplexer of FIG. 6a and 6b, the primary impedance matching circuit 58 could be constituted by a conventional diplexer, such as that of FIG. 7, or a branching circuit such as that of FIG. 8. Since the two high band SAW filters 56 and 58 of FIG. 10b have the same passbands of the high band SAW filters 32 and 34 of FIG. 6b, the second impedance matching circuit 60 of FIG. 10b could be realised by an identical circuit to that of the secondary impedance matching circuit 40 of FIG. 6b—i.e. a DCS/PCS SAW duplexer. Similarly, the secondary impedance matching circuit 62 of FIG. 10b is designed so that together with the low band SAW filters 52 and 54, it constitutes an AGSM/EGSM SAW duplexer.

Figure 11:
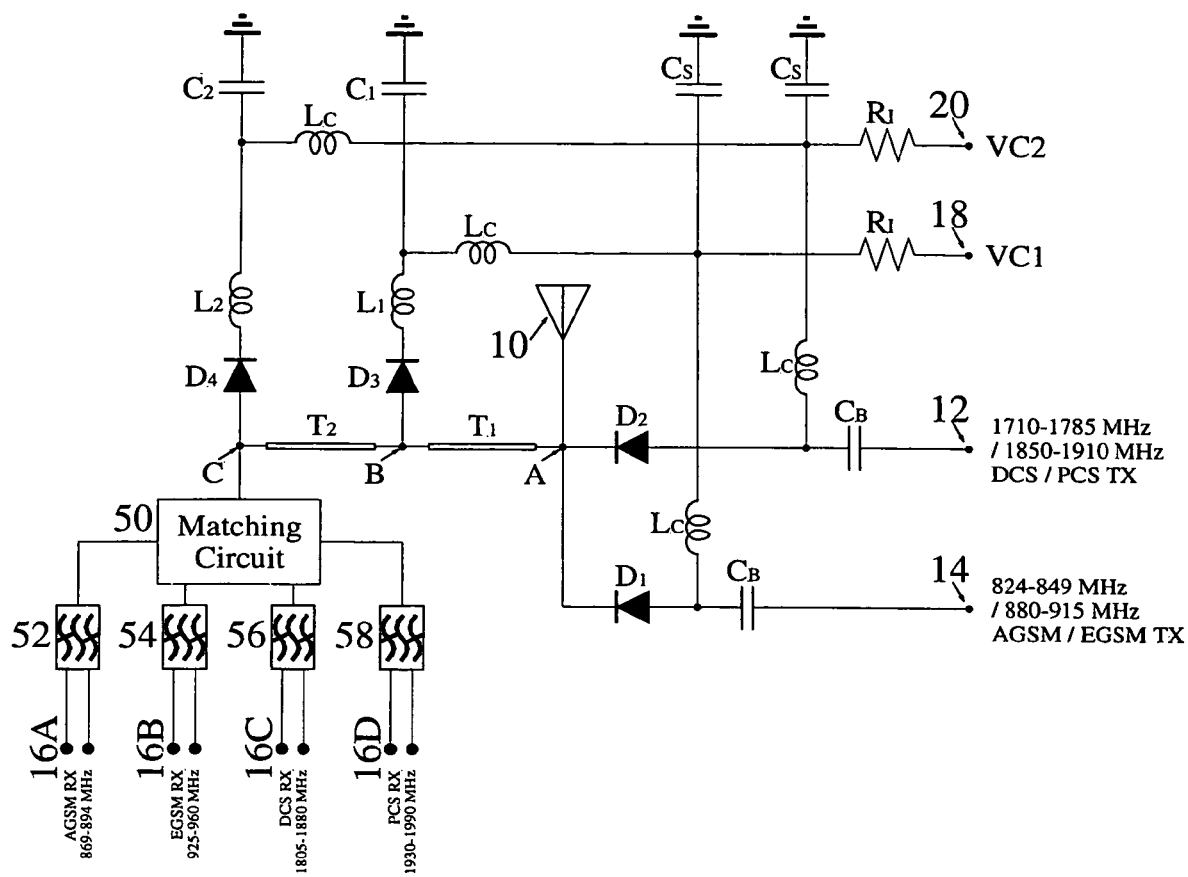

A quad band FEM, implemented using the SAW quadplexer of FIG. 10a and the dual-band SP3T ASM of FIG. 1, is shown in FIG. 11. As above, the quad band FEM of FIG. 11 comprises two separate circuits, an ASM and a SAW quadplexer. This structure facilitates a modular design approach, as the two structures are substantially independent of each other.

This specification has described a novel ASM, which is based around a dual band SP3T PIN diode switch, and which has 4 ports: an antenna port, a TX low band port, a TX high band port and an RX port. This ASM does not require a diplexer to separate the TX low band and TX high bands. It can be used in a dual band cellular handset to connect an antenna to a TX low band output, a TX high band output, and an RX input. The disclosed ASM has lower insertion loss than a conventional ASM, and the VSWR is also lower.

The ASM presented here can be configured to offer the same functionality of a conventional 5 port dual band ASM, by the inclusion of a diplexer at the RX port. This configuration offers the benefit of lower insertion loss, and improved VSWR in both TX modes compared with a conventional dual band ASM.

This specification has further described a SAW triplexer circuit, which has a single input and three separate outputs and which can be used to direct electrical signals which fall within the pass band of any one of the SAW filters from the single input to the output of the relevant SAW filter. This specification has furthermore described a front end module (FEM) which is constructed using the above dual band SP3T ASM and the above SAW triplexer. The FEM constructed in this fashion has very low insertion loss in both TX modes, in addition, the VSWR of this FEM is also very low in both TX modes.

This specification has further described a SAW quadplexer circuit, which has a single input and four separate outputs and which can be used to direct electrical signals which fall within the pass band of any one of the four SAW filters from the single input to the output of the relevant SAW filter. This specification has furthermore described a front end module (FEM) which is constructed using the above dual band SP3T ASM and the above SAW quadplexer. The quad band FEM constructed in this fashion has very low insertion loss in both TX modes, in addition, the VSWR of this FEM is also very low in both TX modes.

The invention is not limited to the embodiments described herein which may be modified or varied without departing from the scope of the invention.

The invention claimed is:

1. A switching circuit for use at the antenna of a multiband mobile cellular handset, the circuit comprising:
    an antenna port,
    a transmit (TX) low band port,
    a TX high band port,
    at least one receiver (RX) port,
    the circuit further comprising a single pole, triple throw (SP3T) solid state voltage-controlled switch which includes a plurality of single pole, single throw (SP1T) solid state switching devices to selectively connect any one of the TX low band port, TX high band port and RX port to the antenna port
    the antenna port is connected to the TX low band port via a first SP1T device, to the TX high band port via a second SP1T device, and to the RX port via first and second frequency-dependent phase shifting elements connected in series,
    the switching circuit further including a first tuned circuit connected to the junction of the first and second frequency-dependent phase shifting elements via a third SP1T device and a second tuned circuit connected to an end of the second frequency-dependent phase shifting element via a fourth SP1T device, the first tuned circuit being tuned to resonate substantially at a center of a TX high band frequency range, the second tuned circuit being tuned to resonate substantially at a center of a TX low band frequency range, the first frequency-dependent phase shifting element corresponding to a quarter wavelength at frequencies in the TX high band frequency range, and the first and second frequency-dependent impedances in combination corresponding to a quarter wavelength at frequencies in the TX low band frequency range,
    wherein the first SP1T device includes an anode connected to the antenna port and a cathode connected to the TX low band port,
    wherein the second SP1T device includes an anode connected to the antenna port and a cathode connected to the TX high band port,
    wherein the third SP1T device includes an anode connected to the junction of the first and second frequency-dependent impedances and a cathode connected to the first tuned circuit, and
    wherein the fourth SP1T device includes an anode connected to the end of the second frequency-dependent impedance and a cathode connected to the second tuned circuit,
    the tuning circuit further including a first voltage input terminal connected to the anode of the first SP1T device and the cathode of the third SP1T device and a second voltage input terminal connected to the anode of the second SP1T device and the cathode of the fourth SP1T device.

2. A switching circuit as claimed in claim 1, wherein the SP1T switching devices are diodes.

3. A switching circuit as claimed in claim 1, wherein the first and second frequency-dependent phase shifting elements are first and second transmission lines respectively.

4. A switching circuit as claimed in claim 1, wherein the first and second frequency-dependent impedances are first and second LC networks.

5. A switching circuit as claimed in claim 1, wherein the at least one RX port comprises a plurality of different band RX ports derived from a common node of the circuit.

6. A switching circuit as claimed in claim 5, wherein the different band RX ports are each derived via a respective RF bandpass filter from the common node of the circuit.

7. A circuit for directing an RF input signal, appearing at a common node of said circuit and which may occupy any one of at least three mutually exclusive frequency bands, to a respective circuit output, the circuit comprising:
    at least three RF bandpass filters, each having a pass band corresponding to a respective one of the mutually exclusive frequency bands of the RF input signal, and
    an impedance matching circuit connecting said RF filters in parallel to said common node, the impedance matching circuit configured so that, within the pass band of any given RF filter, the impedance from said common node along the circuit paths through the other RF filters is high compared to the impedance along the circuit path through the given RF filter,
    the impedance matching circuit including a first sub-circuit connected to said common node and having a low-band output and a high-band output, and
    a second sub-circuit connected to the high-band output of the first sub-circuit and having first and second outputs for upper and lower bands of the high-band output.

8. A circuit as claimed in claim 7, wherein the RF filters are SAW filters.

9. A circuit as claimed in claim 7, wherein the RF filters have a balanced output.

10. A circuit as claimed in claim 7, wherein the low band output of the first sub-circuit comprises a parallel tuned circuit and the high band output of the first sub-circuit comprises a series tuned circuit.

11. A circuit as claimed in claim 7, wherein one output of the second sub-circuit comprises a transmission line and the other output of the second sub-circuit comprises a tuned circuit.

* * * * *

UNITED STATES PATENT AND TRADEMARK OFFICE
CERTIFICATE OF CORRECTION

| | |
|---|---|
| PATENT NO. | : 7,239,853 B2 |
| APPLICATION NO. | : 10/714023 |
| DATED | : July 3, 2007 |
| INVENTOR(S) | : Brian Kearns |

It is certified that error appears in the above-identified patent and that said Letters Patent is hereby corrected as shown below:

Delete Column 11 line 30 through column 12 line 17 and replace with the following:

Claim 1. A switching circuit for use at the antenna of a multiband mobile cellular handset, the circuit comprising:

an antenna port, a transmit (TX) low band port, a TX high band port, at least one receiver (RX) port, the circuit further comprising a single pole, triple throw (SP3T) solid state voltage-controlled switch which includes a plurality of single pole, single throw (SP1T) solid state switching devices to selectively connect any one of the TX low band port, TX high band port and RX port to the antenna port the antenna port is connected to the TX low band port via a first SP1T device, to the TX high band port via a second SP1T device, and to the RX port via first and second frequency-dependent phase shifting elements connected in series, the switching circuit further including a first tuned circuit connected to the junction of the first and second frequency-dependent phase shifting elements via a third SP1T device and a second tuned circuit connected to an end of the second frequency-dependent phase shifting element via a fourth SP1T device, the first tuned circuit being tuned to resonate substantially at a center of a TX high band frequency

UNITED STATES PATENT AND TRADEMARK OFFICE
CERTIFICATE OF CORRECTION

PATENT NO.         : 7,239,853 B2
APPLICATION NO. : 10/714023
DATED                 : July 3, 2007
INVENTOR(S)       : Brian Kearns It is certified that error appears in the above-identified patent and that said Letters Patent is hereby corrected as shown below:

range, the second tuned circuit being tuned to resonate substantially at a center of a TX low band frequency range, the first frequency-dependent phase shifting element corresponding to a quarter wavelength at frequencies in the TX high band frequency range, and the first and second frequency-dependent phase shifting elements in combination corresponding to a quarter wavelength at frequencies in the TX low band frequency range, wherein the first SP1T device includes a cathode connected to the antenna port and an anode connected to the TX low band port, wherein the second SP1T device includes a cathode connected to the antenna port and an anode connected to the TX high band port, wherein the third SP1T device includes an anode connected to the junction of the first and second frequency-dependent phase shifting elements and a cathode connected to the first tuned circuit, and wherein the fourth SP1T device includes an anode connected to the end of the second frequency-dependent phase shifting element and a cathode connected to the second tuned circuit, the tuning circuit further including a first voltage input terminal connected to the anode of the first SP1T device and the cathode of the third SP1T device and a second voltage input terminal connected to the anode of the second SP1T device and the cathode of the fourth SP1T device.

UNITED STATES PATENT AND TRADEMARK OFFICE
CERTIFICATE OF CORRECTION

PATENT NO. : 7,239,853 B2
APPLICATION NO. : 10/714023
DATED : July 3, 2007
INVENTOR(S) : Brian Kearns It is certified that error appears in the above-identified patent and that said Letters Patent is hereby corrected as shown below:

Delete Column 12 lines 23 through 25 and replace with the following:

Claim 4. A switching circuit as claimed in claim 1, wherein the first and second frequency-dependent phase shifting elements are first and second LC networks.

Signed and Sealed this

Twenty-fifth Day of March, 2008

JON W. DUDAS
*Director of the United States Patent and Trademark Office*